United States Patent Office 3,755,449
Patented Aug. 28, 1973

3,755,449
PROCESS FOR PRODUCING AMINODIPHENYL ETHER DERIVATIVES
Ken Ito and Hiroshi Kaminaka, Toyonaka-shi, Osaka-fu, and Takashi Tamura, Ibaraki-shi, Osaka-fu, Japan, assignors to Sumitomo Chemical Co., Ltd.
No Drawing. Filed Feb. 25, 1969, Ser. No. 802,214
Claims priority, application Japan, Feb. 28, 1968, 43/13,106
Int. Cl. C07c 93/14
U.S. Cl. 260—571    1 Claim

ABSTRACT OF THE DISCLOSURE

Process for catalytic reduction of a nitrodiphenyl ether derivative to produce an aminodiphenyl ether derivative which comprises treating the nitrodiphenyl ether derivative with hydrogen in the presence of Raney nickel in dimethylformamide at a temperature of 50 to 200° C. under a pressure of 5 to 150 kg./cm.$^2$ for a period of 1 to 20 hours.

---

The present invention relates to a process for producing amiodiphenyl ether derivatives. It also relates to a process for catalyitc hydrogenation of nitrodiphenyl ether derivatives with Raney nickel in dimethylformamide to produce aminodiphenyl ether derivatives.

In this specification, the term "aminodiphenyl ether derivative(s)" is intended to mean a diphenyl ether(s) bearing at least one amino group and includes particularly the compound(s) of the formula:

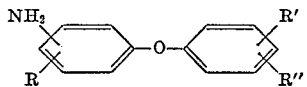

wherein R, R' and R'' are each hydrogen, lower alkyl (e.g. methyl, ethyl, propyl), lower alkoxy (e.g. methoxy, ethoxy, propyl), aryl (e.g. phenyl, xylyl, tolyl), lower alkoxycarbonyl (e.g. methoxycarbonyl, ethoxycarbonyl, propoxycarbonyl) or amino. The term "nitrodiphenyl ether derivative(s)" is intended to mean a diphenyl ether(s) bearing at least one nitro group and includes particularly the compound(s) of the formula:

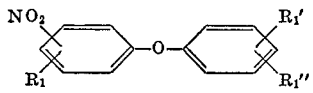

wherein $R_1$, $R_1'$ and $R_1''$ are each hydrogen, lower alkyl (e.g. methyl, ethyl, propyl), lower alkoxy (e.g. methoxy, ethoxy, propoxy), aryl (e.g. phenyl, xylyl, tolyl), lower alkoxycarbonyl (e.g. methoxycarbonyl, ethoxycarbonyl, propoxycarbonyl) or nitro.

Hitherto, aminodiphenyl ether derivatives have generally been produced by reduction of nitrodiphenyl ether derivatives with iron powder and hydrochloric acid. However, the yield of the product in such process is not satisfactory. Further, the elimination of iron powder from the product encounters much difficulty. Moreover, the product is occasionally colored probably due to the contaminating iron.

In order to overcome these drawbacks, the adoption of catalytic hydrogenation in vapor-phase or liquid-phase comes into consideration. Vapor-phase catalytic hydrogenation is, however, not applicable, because the boiling points of nitrodiphenyl ether derivatives are considerably high. For adopting liquid-phase catalytic hydrogenation, the selection of a suitable solvent is essential. Although lower alkanols such as methanol are ordinarliy used as solvents for the catalytic hydrogenation of aromatic nitro compounds, those are not industrially employed for the hydrogenation of nitrodiphenyl ether derivatives, because their solubilities into lower alkanols are extremely low and quite large amounts of lower alkanols are required for the successful completion of the hydrogenation.

In the course of the investigation seeking a suitable solvent for the hydrogenation of nitrodiphenyl ether derivatives, it has been discovered that dimethylformamide, dioxane, tetrahydrofuran and acetone have good solubility for nitrodiphenyl ether derivatives and aminodiphenyl ether derivatives, but only in dimethylformamide the hydrogenation of nitrodiphenyl derivatives proceeds smoothly.

It has also been discovered that, of various reduction catalysts, for example, Raney nickel, nickel-diatomaceous and copper-chromite catalyst, only Raney nickel catalyst is suitable for the hydrogenation of nitrodiphenyl ether derivatives in dimethylformamide. In this connection, it is notable that dimethylformamide has never been used as a solvent in catalytic reduction of nitrodiphenyl ether derivatives.

Thus, the process of the present invention comprises hydrogenating a nitrodiphenyl ether derivative catalytically with hydrogen in the presence of Raney nickel in dimethylformamide to give an aminodiphenyl ether derivative. The yield of the product reaches around 95% or more and the dimethylformamide can be recovered at a rate of 95% or more. Moreover, the decomposition of dimethylformamide and/or the side-reaction caused by dimethylformamide such as dimethylamination of the produced aminodiphenyl ether derivative occur only to an extent as may be disregarded.

The starting nitrodiphenyl ether derivative can be produced in an excellent yield by condensation of a halogenated nitrobenzene with a phenol derivative in dimethylformamide without fear of explosion as illustrated below and, in view of the use of the same and common solvent in condensation and hydrogenation reactions, the process of this invention is the most advantageously carried out following to the condensation. Thus, the process of this invention will be hereinafter illustrated in detail in combination with the previous production of the starting compound.

The starting nitrodiphenyl ether derivative is produced by reacting a halogenated nitrobenzene of the formula:

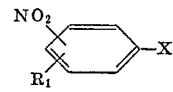

wherein X is halogen (e.g. chlorine, bromine) and $R_1$ is as defined above with a phenol derivative of the formula:

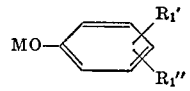

wherein M is hydrogen or alkali metal (e.g. sodium, potassium) and $R_1'$ and $R_1''$ are each as defined above in dimethylformamide at a temperature between 120 and 170° C. for a period of 5 to 20 hours. In this case, the addition of a hydrogen halide-eliminating agent such as alkali hydroxide (e.g. sodium hydroxide, potassium hydroxide), alkali carbonate (e.g. sodium carbonate, potassium carbonate) or alkali bicarbonate (e.g. sodium bicarbonate, potassium bicarbonate) to the reaction system is preferred.

Examples of the halogenated nitrobenzene are o-chloronitrobenzene, p-chloronitrobenzene, o-bromonitrobenzene, p-bromonitrobenzene, o,p-dinitrochlorobenzene, o,p-dinitrobromobenzene, etc. As the phenol derivative, there are exemplified nitrophenol, nitrocresols, hydroxybenzoates, phenylphenols, etc.

The reaction mixture in the above condensation reaction may be subjected to the subsequent hydrogenation without isolation of the produced nitrodiphenyl ether derivative. In order to faciliate the treatment of the final product after the hydrogenation, the filtration of the reaction mixture for separation of the by-produced inorganic salt is preferred. This is an advantageous feature of this invention, compared with conventional reduction procedures requiring troublesome operations for the previous elimination of poisonous materials to the reduction catalyst.

The hydrogenation is carried out by treatment of the nitrodiphenyl ether derivative with hydrogen in the presence of Raney nickel in dimethylformamide at a temperature of 50 to 200° C. (preferably 70 to 130° C.) under a pressure of 5 to 150 kg./cm.$^2$ (preferably 10 to 50 kg./cm.$^2$), usually for a period of 1 to 20 hours. The amount of the Raney nickel to be used may be from 0.5 to 5% by weight to that of the nitrodiphenyl ether derivative. The amount of the dimethylformamide to be employed depends on the kind of the nitrodiphenyl ether derivative and may be 1 to 10 times (preferably 3 to 7 times) that of the latter.

The thus produced aminodiphenyl ether derivative can be recovered from the reaction mixture by filtering the latter and distilling the filtrate to eliminate water and dimethylformamide. For further purification, the resulting product may be subjected to distillation and/or recrystallization. As the yields in the condensation and the hydrogenation are 95% or more, the total yield of the aminodiphenyl ether derivative from the halogenated nitrobenzene or the phenol derivative can reach more than 90%.

Practical and presently-preferred embodiments of the present invention are illustratively shown in the following examples. In these examples, parts are by weight.

EXAMPLE 1

In a reaction vessel equipped with a stirrer, a thermometer and a condenser having a water-oil separator at the lower part, p-nitrophenol (69.5 parts), p-chloronitrobenzene (78 parts), potassium carbonate (69 parts) and dimethylformamide (200 parts) are charged, and the mixture is heated while stirring. With the proceeding of the reaction, water and carbon dioxide are by-produced. For elimination of the water as an azeotrope, benzene (25 parts) is occasionally added to the mixture. The reaction is completed at 120 to 150° C. within 15 hours. The reaction mixture is filtered to separate the by-produced potassium chloride, which is washed with dimethylformamide (100 parts). The filtrate and the washing dimethylformamide are combined together and charged in an autoclave. After the addition of Raney nickel (2 parts), the autoclave is flushed with hydrogen gas. Then, the hydrogenation is carried out 100 to 110° C. under 10 to 15 kg./cm.$^2$ for 5 hours. The reaction mixture is cooled and filtered to separate the catalyst. The filtrate is concentrated to recover the solvent and distilled at 230° C. under 8 mm. Hg to collect 4,4'-diaminodiphenyl ether (94 parts). Yield, 94% (calculated from p-nitrophenol).

The recovered solvent is dried and purified to give dimethylformamide (288 parts). Recovery rate, 96%.

EXAMPLE 2

The condensation is carried out as in Example 1, and the reaction mixture is charged in an autoclave. After the addition of Raney nickel (2 parts), the reduction is executed at 100 to 110° C. under 10 to 15 kg./cm.$^2$ of hydrogen gas for 8.5 hours. The reaction mixture is filtered to remove the catalyst and the inorganic salt and then distilled to give 4,4'-diaminodiphenyl ether (91 parts).

EXAMPLE 3

In the same reaction vessel as in Example 1, dimethylformamide (250 parts), p-nitrochlorobenzene (78 parts), potassium phenoxide monohydrate (75 parts) and benzene (35 parts) are charged, and the mixture is heated while stirring. The reaction starts around 115° C. and is completed at 130 to 140° C. within 18 hours. The by-produced water is eliminated from the reaction system as an azeotrope with benzene. The reaction mixture is filtered to separate the by-produced potassium chloride, which is washed with dimethylformamide (80 parts). The filtrate and the washing dimethylformamide are charged in an autoclave. After the addition of Raney nickel (3 parts), the reduction is executed at 75 to 80° C. under 50 kg./cm.$^2$ of hydrogen gas for 3 hours. The reaction mixture is filtered to remove the catalyst and the filtrate is concentrated to give 4-aminodiphenyl ether (89 parts). Yield, 95.5%. When recrystallized from water, there are obtained pure crystals melting at 84° C.

EXAMPLE 4

3-methyl-4-nitrophenol (77 parts) and 3-methyl-4-nitro-1-bromobenzene (108 parts) are reacted in the presence of potassium carbonate (18 parts) and sodium carbonate (14 parts) in dimethylformamide to give 3,3'-dimethyl-4,4'-dinitrodiphenyl ether (140 parts). In an autoclave, 3,3'-dimethyl-4,4'-dinitrodiphenyl ether (140 parts), dimethylformamide (450 parts) and Raney nickel (4 parts) are charged, and the autoclave is flushed with hydrogen. The hydrogenation is carried out at 90 to 100° C. under 25 to 30 kg./cm.$^2$ for 8 hours whereby 3,3'-dimethyl-4,4'-diaminodiphenyl ether (106 parts) is obtained.

EXAMPLE 5

2,4-dinitro-4'-phenyldiphenyl ether (300 parts), obtained by the reaction between potassium p-phenylphenolate and 2,4-dinitro-1-chlorobenzene in dimethylformamide, is charged in an autoclave. After the addition of dimethylformamide (1000 parts) and Raney nickel (7.5 parts) thereto, the hydrogenation is carried out at 120 to 130° C. under 30 to 40 kg./cm.$^2$ for 6.5 hours whereby 2,4-diamino-4'-phenyldiphenyl ether (236 parts) is obtained.

We claim:

1. A process for producing aminodiphenyl ether derivatives of the formula:

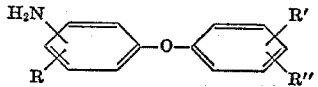

wherein R, R' and R'' are each hydrogen, lower alkyl having 1 to 3 carbon atoms, lower alkoxy having 1 to 3 carbon atoms, phenyl, xylyl, tolyl or amino, which comprises reacting at a temperature of 120–170° C. and for a period of 5–20 hours, a halogenated nitrobenzene derivative of the formula:

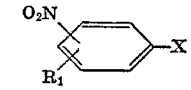

wherein X is chlorine or bromine and $R_1$ is hydrogen, lower alkyl having 1 to 3 carbon atoms, lower alkoxy having 1 to 3 carbon atoms, phenyl, xylyl, tolyl or nitro, with a phenol derivative of the formula:

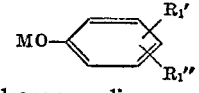

wherein M is hydrogen, sodium or potassium and $R_1'$ and $R_1''$ are each hydrogen, lower alkyl having 1 to 3 carbon atoms, alkoxy having 1 to 3 carbon atoms, phenyl, xylyl, tolyl or nitro, in dimethylformamide and in the presence of at least one hydrogen halide-eliminating agent selected from the group consisting of sodium hydroxide, potassium hydroxide, sodium carbonate, potassium carbonate, sodium bicarbonate and potassium bicarbonate, to form a nitrodiphenyl ether derivative of the formula:

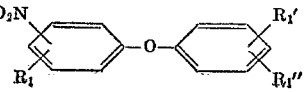

wherein $R_1$, $R_1'$ and $R_1''$ are each as defined above, and hydrogenating at a temperature of 50 to 200° C. under a pressure of 5 to 150 kg./cm.$^2$ and for a period of 1 to 20 hours the nitrodiphenyl ether derivative with hydrogen, in the presence of 0.5 to 5% by weight, based on the amount of the nitrodiphenyl ether derivative, of Raney nickel and in dimethylformamide, the dimethylformamide being used in an amount 1 to 10 times that of the nitrodiphenyl ether derivative, to form the said aminodiphenyl ether derivative.

References Cited

UNITED STATES PATENTS 1,140,316    7/1964    Towle           260—571 X

FOREIGN PATENTS

M193    2/1961    France           260—574

OTHER REFERENCES

Kittila, DMF, E. I. du Pont, Wilmington, Del., 1967, pp. 131–133.

LEWIS GOTTS, Primary Examiner

C. F. WARREN, Assistant Examiner

U.S. Cl. X.R.

260—471 R, 580, 612 R